(12) United States Patent
Hama

(10) Patent No.: US 7,757,711 B2
(45) Date of Patent: Jul. 20, 2010

(54) FLOW CONTROLLER

(75) Inventor: Tomio Hama, Okaya (JP)

(73) Assignee: Yugen Kaisha Hama International, Okaya-Shi, Nagano (JP)

( * ) Notice: Subject to any disclaimer, the term of this patent is extended or adjusted under 35 U.S.C. 154(b) by 379 days.

(21) Appl. No.: 11/822,959

(22) Filed: Jul. 11, 2007

(65) Prior Publication Data

US 2008/0011362 A1    Jan. 17, 2008

(30) Foreign Application Priority Data

Jul. 12, 2006    (JP)    ............... 2006-191623

(51) Int. Cl.
    *F16K 1/52*    (2006.01)
    *F16K 11/12*   (2006.01)
    *F16K 15/14*   (2006.01)

(52) U.S. Cl. ............ 137/601.19; 137/601.21; 137/625.3; 137/853

(58) Field of Classification Search ............ 137/601.19, 137/601.2, 601.21, 513.3, 513.7, 853, 625.3; 251/205, 206
See application file for complete search history.

(56) References Cited

U.S. PATENT DOCUMENTS

| | | | |
|---|---|---|---|
| 2,980,392 A * | 4/1961 | Greenwood | 251/210 |
| 3,521,852 A * | 7/1970 | Gillis, Jr. | 251/121 |
| 3,791,413 A * | 2/1974 | Muller et al. | 137/625.3 |
| 4,022,113 A   | 5/1977 | Blan | |
| 4,230,300 A * | 10/1980 | Wiltse | 251/205 |
| 4,262,695 A * | 4/1981 | Iizumi | 137/601.13 |
| 5,163,476 A * | 11/1992 | Wessman | 137/625.3 |
| 5,269,346 A * | 12/1993 | Yuda | 137/599.01 |
| 5,485,867 A * | 1/1996 | Stoll | 137/599.02 |
| 6,397,890 B1 * | 6/2002 | Mickelson et al. | 137/625.34 |

FOREIGN PATENT DOCUMENTS

| | | |
|---|---|---|
| DE | 2 255 282 | 5/1974 |
| JP | 47-22542 | 11/1972 |
| JP | 51-124636 | 10/1976 |
| JP | 6-331059 A | 11/1994 |
| JP | 06-331059 A | 11/1994 |
| JP | 11-093915 | 4/1999 |

* cited by examiner

*Primary Examiner*—Stephen Hepperle
(74) *Attorney, Agent, or Firm*—Birch, Stewart, Kolasch & Birch, LLP

(57) ABSTRACT

The flow controller is capable of optionally controlling flow volume of controlled flow and reducing weight and a production cost. The flow controller comprises: a main body having a first flow path and a second flow path; a ring packing for sealing the flow paths; a rod-shaped flow control member tightly pierced through the ring packing and capable of moving with respect to the ring packing, the flow control member having a third flow path; operation means for moving the flow control member so as to control the flow volume; a fourth flow path provided outside of the ring packing; and a check valve prohibiting a fluid to flow from the second flow path to the first flow path via the fourth flow path and allowing the fluid to flow from the first flow path to the second flow path via the fourth flow path.

10 Claims, 11 Drawing Sheets

FIG.7
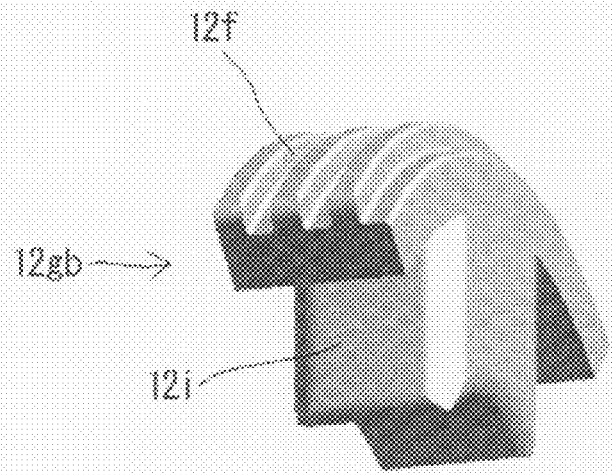
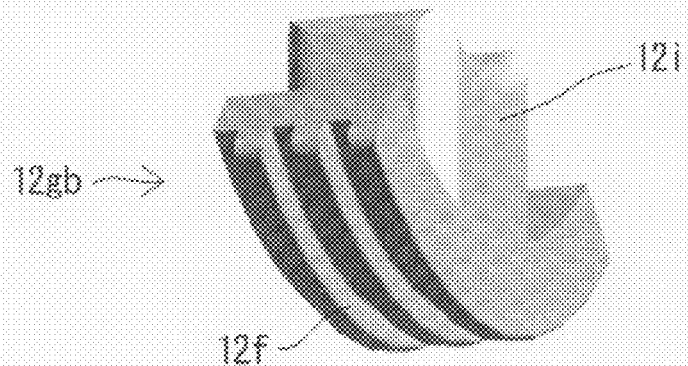

FLOW CONTROLLER

BACKGROUND OF THE INVENTION

The present invention relates to a flow controller, which has a first port and a second port and which is capable of flowing a fluid from the second port to the first port as controlled flow, whose flow volume is controlled, and flowing the fluid from the first port to the second port as free flow.

A conventional flow controller is disclosed in Japanese Patent Kokai Gazette No. 6-331059, and the conventional flow controller is shown in FIG. 15.

A main body 80 of the flow controller has an opening section 82, which acts as a first port, and an opening section 84, which acts as a second port. A control member 88 having a control hole 86, through which a fluid passes, is provided in a flow path, which makes the first port 82 and the second port 84 communicate each other. A needle 90 is capable of moving in the axial direction and entering the control hole 86. By varying a length of inserting a tapered end of the needle 90 into the control hole 86, a sectional area of a clearance formed in the flow path, through which the fluid can pass, is varied, so that flow volume of controlled flow can be controlled (see paragraph 0015 of the Japanese patent kokai gazette No. 6-331059). The axial movement of the needle 90 is adjusted by manually rotating a rotary member 92.

An outer flow path, which makes the first port 82 and the second port 84 communicate each other, is formed outside of the control member 88. A diaphragm 94, which acts as a check valve, is provided in the outer flow path. The diaphragm 94 prohibits the fluid to flow from the second port 84 to the first port 82 via the outer flow path; the diaphragm 94 allows the fluid to flow from the first port 82 to the second port 84 via the outer flow path (see paragraphs 0013 and 0015-0017 of the Japanese patent kokai gazette No. 6-331059).

As described above, in the conventional flow controller shown in FIG. 15, the flow volume of the controlled flow is controlled by adjusting the sectional area of the clearance between an outer face of the needle 90 and an inner face of the control hole 86. The sectional area can be adjusted by moving the needle 90 with respect to the control hole 86.

However, it is difficult to precisely control the flow volume of the controlled flow when the flow volume is small. This disadvantage will be explained with reference to FIGS. 16A and 16B.

In FIG. 16A, no clearance is formed between the outer face of the needle 90 and the inner face of the control hole 86. Namely, no controlled flow passes. In this state, the needle 90 is moved so as to form the clearance C between the outer face of the needle 90 and the inner face of the control hole 86. The state of forming the clearance C is shown in FIG. 16B. The clearance C is formed around an entire circumference of the needle 90.

To flow the controlled flow with small flow volume, the needle 90 in the state shown in FIG. 16A is slightly moved. However, the clearance C is formed around the entire circumference of the needle 90, so the sectional area of the clearance C rapidly increases. Therefore, it is difficult to precisely control the flow volume of the controlled flow when the flow volume thereof is small.

Further, fluid resistance strongly works to the tapered needle 90, so the needle 90 must be made of a high rigidity material, e.g., steel, so as to secure enough strength of the needle 90. Therefore, it is difficult to reduce weight and a production cost of the flow controller.

SUMMARY OF THE INVENTION

The present invention was conceived to solve the above described problems.

An object of the present invention is to provide a flow controller, which is capable of optionally controlling flow volume of controlled flow and reducing weight and a production cost.

To achieve the object, the present invention has following structures.

Namely, the flow controller of the present invention comprises:

a main body having a first flow path, which is communicated to a first port, and a second flow path, which is communicated to a second port;

a ring packing being provided between the first flow path and the second flow path so as to seal the first flow path and the second flow path;

a rod-shaped flow control member being tightly pierced through the ring packing and capable of relatively moving, in the axial direction, with respect to the ring packing, the flow control member having a third flow path, whose end is opened at least in an outer circumferential face thereof and which communicates the first flow path to the second flow path via the ring packing, wherein flow volume of a fluid flowing in the third flow path is controlled by adjusting a position of the flow control member with respect to the ring packing;

operation means for relatively moving the ring packing and/or the flow control member in the axial direction of the flow control member;

a fourth flow path being provided outside of the ring packing so as to communicate the first flow path to the second flow path; and a check valve prohibiting the fluid to flow from the second flow path to the first flow path via the fourth flow path and allowing the fluid to flow from the first flow path to the second flow path via the fourth flow path.

With this structure, the flow volume of the fluid flowing in the third flow path can be optionally controlled by adjusting aperture of the third flow path, which corresponds to the position of the flow control member with respect to the ring packing. Unlike the conventional flow controller, fluid resistance does not strongly work to a weak part, e.g., tapered needle, because the flow volume is controlled by the third flow path, which is formed around the rod-shaped flow control member, and the ring packing. Therefore, the flow control member can be composed of a light and inexpensive material, e.g., plastic.

In the flow controller, a circumferential width of the end of the third flow path, which is opened in the outer circumferential face of the flow control member, may be gradually increased toward one end of the flow control member.

In the flow controller, the third flow path may be a bifurcated notch, which is formed by notching the one end of the flow control member in the axial direction and whose width is gradually increased toward the one end thereof. With this structure, the third flow path for optionally controlling the flow volume of controlled flow can be constituted with a simple shape.

In the flow controller, the bifurcated notch may be opened in both side faces of the flow control member, and notching depths of the bifurcated notch in the both side faces may be mutually different. With this structure, the first flow path and the second flow path can be communicated via the bifurcated notch in the one side face, whose depth is deeper than that in the other side face. Therefore, the flow volume can be precisely controlled even if the flow volume of the controlled flow is small.

In the flow controller, the third flow path may be opened in the one end face of the flow control member and the outer circumferential face thereof, and a sectional area of the third flow path perpendicular to the axial line of the flow control member may be gradually increased toward the one end of the flow control member. With this structure, the sectional area is gradually reduced toward the other end of the flow control member. In comparison with the conventional flow controller, in which the flow volume is controlled by adjusting the sectional area of the clearance around the outer circumferential face of the needle, the flow controller of the present invention is capable of precisely controlling the flow volume even if the flow volume of the controlled flow is small.

In the flow controller, the operation means may have a screw section, which is connected to the ring packing and/or the flow control member and a part of which is projected from the main body as a knob for rotating the screw section, and the screw section may relatively move the ring packing and/or the flow control member in the axial direction of the flow control member by rotating the knob. With this structure, the simple operation means can be constituted.

In the flow controller, the main body may be a cylinder, in which the first flow path and the second flow path are respectively formed in both end parts and a through-hole is formed in an outer wall constituting one of the first flow path and the second flow path, the operation means may be coaxially provided to the main body, cover at least a part of an outer circumferential face of the main body and the through-hole, and have a cylindrical knob, which can be manually rotated with respect to the main body and in which a first screw section is formed in an inner circumferential face, a projected section may be projected in the direction perpendicular to the axial line of the flow control member from the end part of the flow control member, which corresponds to the one of first flow path and the second flow path, until reaching the inner circumferential face of the knob via the through-hole and have a second screw section, which is screwed with the first screw section of the knob, and the flow control member may be moved in the axial direction thereof by the first screw section and the second screw section, which are operated by rotating the knob. With this structure, the cylindrical main body and the cylindrical knob can be coaxially arranged, so the flow controller can be downsized and have a simple external shape. Further, hoses connected to the first and second ports can be coaxially arranged with the main body, so a required space for installing the flow controller can be reduced.

In the flow controller, the first port and the second port may be provided to the main body, their axial lines may be orthogonally arranged, one end part of the flow control member may be moved toward one of the first port and the second port, the other end part of the flow control member may have a first screw section, the operation means may have a second screw section, which is screwed with the first screw section, and a knob, which is projected from the other end part of the flow control member until outside of the main body and which can be manually rotated, and the flow control member may be moved in the axial direction thereof by the first screw section and the second screw section, which are operated by rotating the knob. With this structure, the first port and the second port are perpendicularly arranged, and the knob is projected. Therefore, a user can easily operate the knob.

In the flow controller, the check valve may include a valve body for closing the fourth flow path formed around the ring packing, the check valve may be integrated with the ring packing and formed into a cone shape, which is inclined and extended from the ring packing toward the second flow path. With this structure, the check valve and the ring packing are integrated, so that the flow controller can be simplified and downsized, and number of parts can be reduced.

In the flow controller, a circular projection may be formed, in an inner circumferential face of the main body, along an outer circumferential face of the cone-shaped valve body, and at least one through-hole may be formed in the circular projection as the fourth flow path. With this structure, the valve body and the ring packing can be held in the main body by the circular projection, and the compact fourth flow path can be formed.

By employing the flow controller of the present invention, the flow volume of the controlled flow can be optionally controlled. Further, weight and a production cost of the flow controller can be reduced.

BRIEF DESCRIPTION OF THE DRAWINGS

Embodiments of the present invention will now be described by way of examples and with reference to the accompanying drawings, in which:

FIG. 7 is a perspective view of a second projection part of the flow control member of the flow controller of the first embodiment;

DETAILED DESCRIPTION OF THE EMBODIMENTS

Preferred embodiments of the present invention will now be described in detail with reference to the accompanying drawings.

First Embodiment

Figure 1:
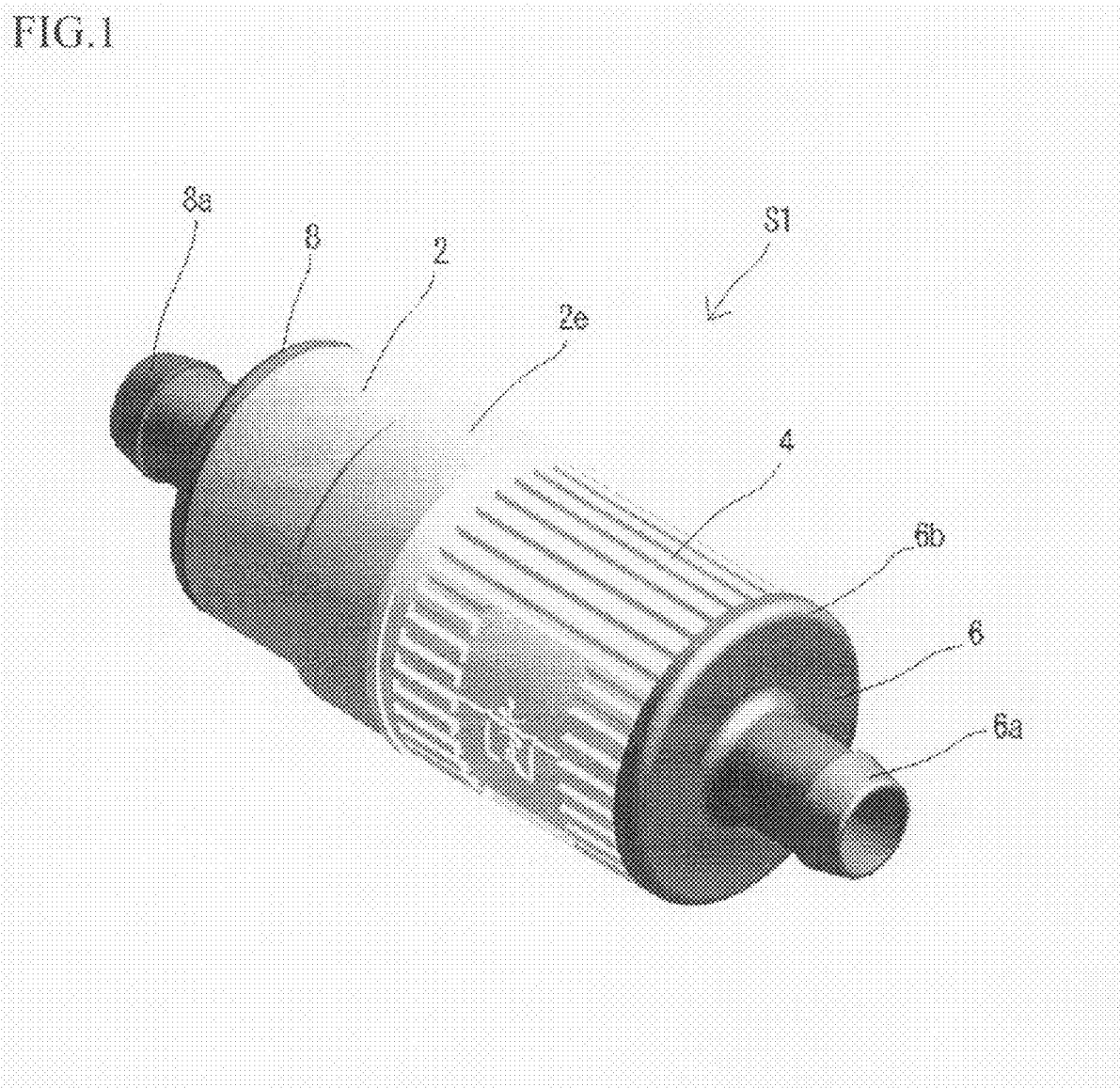
FIG. 1 is a perspective view of a flow controller of a first embodiment.
Figure 2:
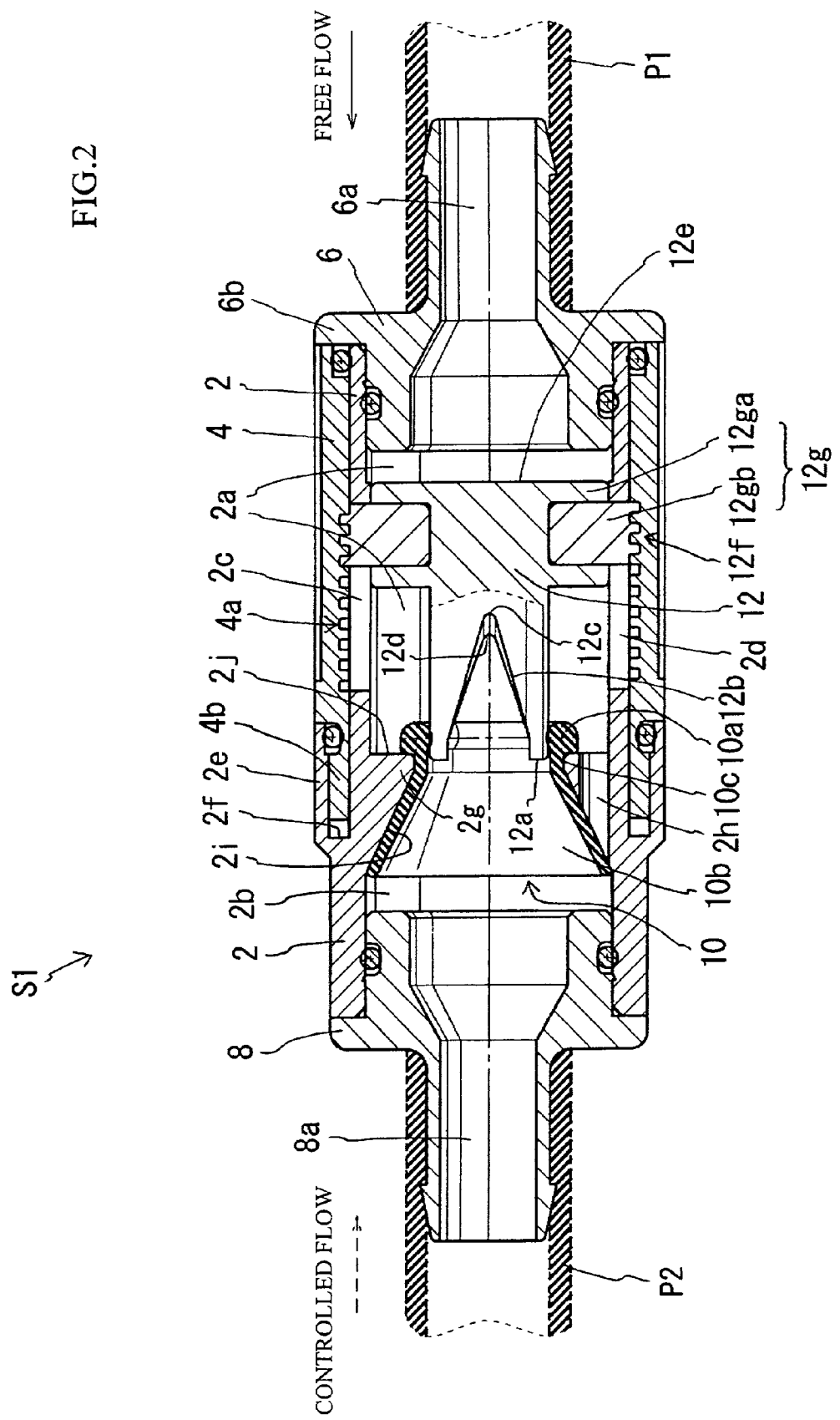
FIG. 2 is a sectional view of the flow controller of the first embodiment.

A perspective view of a flow controller S1 of a first embodiment is shown in FIG. 1, and a sectional view thereof is shown in FIG. 2.

As shown in FIG. 1, the flow controller S1 comprises a cylindrical main body 2 and a cylindrical knob 4, which is coaxially arranged with the main body 2 and covers a part of an outer circumferential face of the main body 2. A user is capable of rotating the knob 4 with respect to the main body 2.

A first nipple member 6, in which a first port 6a is formed, and a second nipple member 8, in which a second port 8a is formed, are respectively attached to both ends of the main body 2. As shown in FIG. 2, fluid passageways P1 and P2, e.g., hoses, which introduce a fluid into and discharge the fluid from the main body 2, are respectively connected to the ports 6a and 8a.

The main body 2 has a first flow path 2a, which is communicated to the first port 6a, and a second flow path 2b, which is communicated to the second port 8a.

Figure 3:
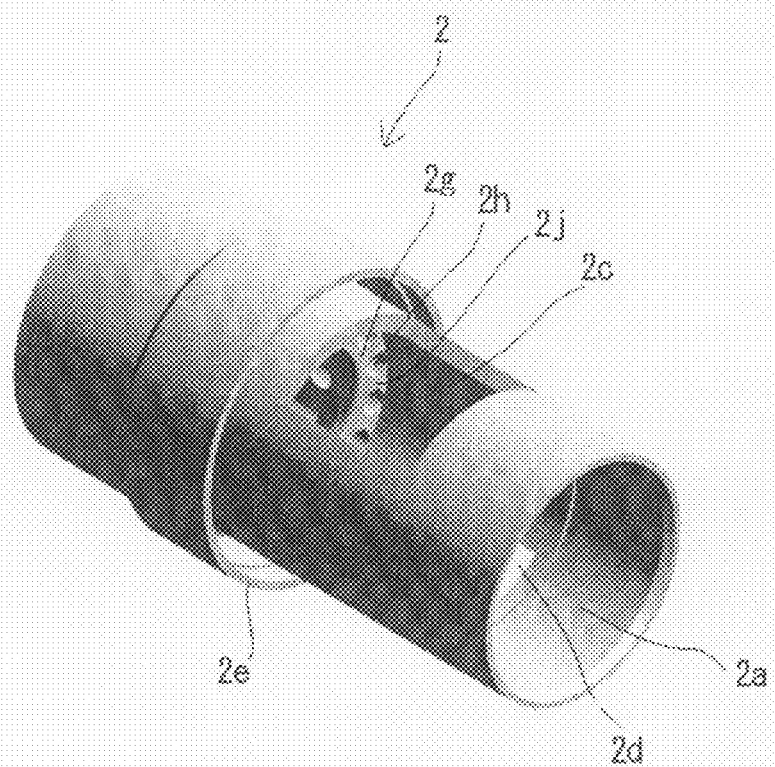
FIG. 3 is a perspective view of a main body of the flow controller of the first embodiment.

Through-holes 2c and 2d are oppositely formed in an outer wall of the main body 2, which constitutes the first flow path 2a (see FIGS. 2 and 3).

As shown in FIG. 2, the knob 4 covers a part of the outer circumferential face of the main body 2 including the through-holes 2c and 2d.

A cover section 2e is formed in one end part of the main body 2. One end part 4b of the knob 4 is inserted in the cover section 2e. Namely, an outer cylinder section (the cover section 2e) apart from the outer circumferential face of the main body 2 is formed in the one end part of the main body 2, and the one end part 4b of the knob 4 is inserted in a space between an inner circumferential face of the outer cylinder section (the cover section 2e) and the outer circumferential face of the main body 2.

The first nipple member 6 is fitted in the other end of the main body 2. The first nipple member 6 further has a flange section 6b, which is radially outwardly extended along the other end face of the main body 2, so that the knob 4 can be retained in the main body 2. Namely, the knob 4 is clamped between the cover section 2e and the flange section 6b, so that the knob 4 can be retained on the outer circumferential face of the main body 2.

Figure 4:
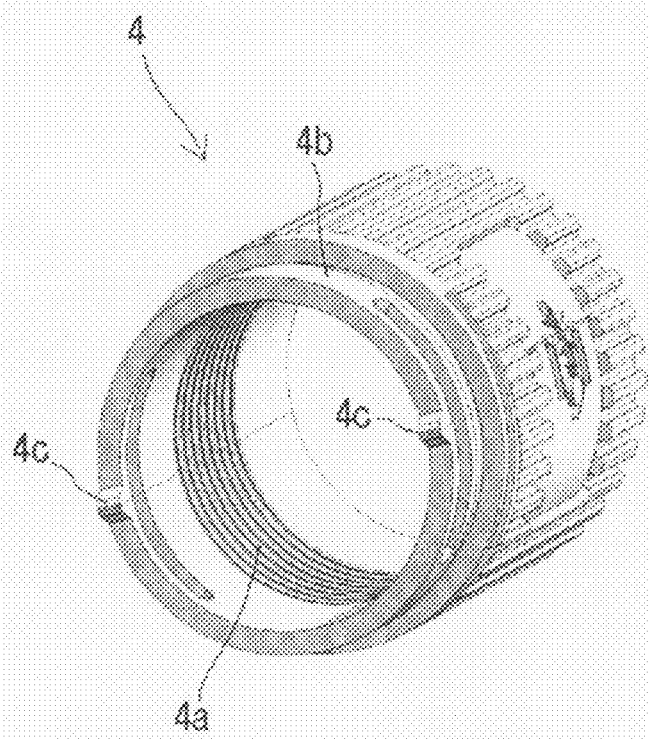
FIG. 4 is a perspective view of a knob of the flow controller of the first embodiment.

A plurality of recesses are formed in an innermost face 2f of the cover section 2e (see FIG. 2) and arranged in the circumferential direction. Projections 4c, which can engage with the recesses, are formed in one end face of the knob 4, which faces the recesses (see FIG. 4). When the user turns the knob 4, the projections 4c run on the recesses. On the other hand, when the user stops turning the knob 4 at an optional rotational position, the projections 4c engages with the recesses, so that the knob 4 can be retained at that position.

A first screw section 4a is formed in a part of an inner circumferential face of the knob 4, which corresponds to the through-holes 2c and 2d. Namely, the first screw section 4a of the knob 4 faces the first flow path 2a of the main body 2 through the through-holes 2c and 2d.

A circular projection 2g is formed in an inner circumferential face of the main body 2 and disposed between the flow paths 2a and 2b. A plurality of through-holes 2h are formed in the circular projections 2g as fourth flow paths, and they are arranged in the circumferential direction.

Figure 5:
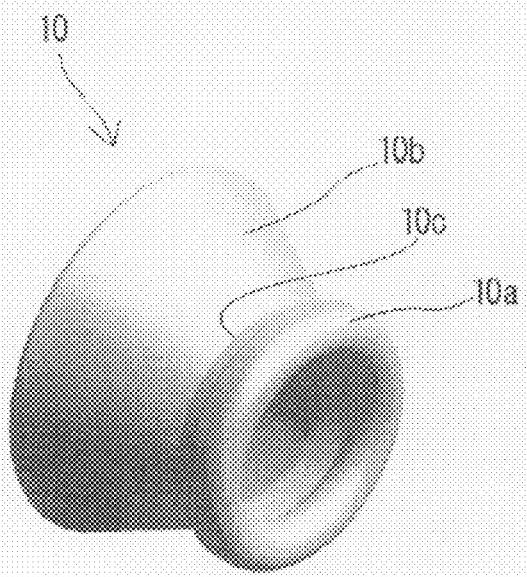
FIG. 5 is a perspective view of a rubber member (a ring packing and a valve body) of the flow controller of the first embodiment.

A rubber member 10 is attached to the circular projection 2g of the main body 2, which is disposed between the first flow path 2a and the second flow path 2b. In the rubber member 10, a ring packing 10a, which seals the first flow path 2a and the second flow path 2b, and a valve body 10b, which is formed into a cone shape, extended from the ring packing 10a toward the second flow path 2b and capable of closing one ends of the fourth flow paths 2h, are integrated (see FIGS. 2 and 5).

As shown in FIG. 2, the cone-shaped valve body 10b is obliquely extended outward from an inner part of the ring packing 10a. With this structure, a neck section 10c is formed between the ring packing 10a and the valve body 10b.

A surface 2i of the circular projection 2g on the second flow path 2b side is formed into a female tapered face along an outer circumferential face of the cone-shaped valve body 10b of the rubber member 10. On the other hand, a surface 2j of the circular projection 2g on the first flow path 2a side is formed into a vertical face.

The outer circumferential face of the cone-shaped valve body 10b of the rubber member 10 is arranged along the slope surface 2i, and the circular projection 2g is engaged with the neck section 10c, so that the rubber member 10 is retained in the main body 2.

The cone-shaped valve body 10b is arranged along the slope surface 2i so as to close the one ends of the fourth flow paths 2h.

When fluid pressure in the first flow path 2a and the fourth flow paths 2h are higher than that in the second flow path 2b, the valve body 10b is pressed and deformed by the pressure of the fluid in the fourth flow paths 2h, so that the fluid flows from the first flow path 2a to the second flow path 2b via the fourth flow paths 2h.

On the other hand, when the fluid pressure in the second flow path 2b is higher than that in the first flow path 2a and the fourth flow paths 2h, the valve body 10b is pressed by the fluid pressure in the second flow path 2b, but the valve body 10b is pressed onto the slope surface 2i and closes the one ends of the fourth flow paths 2h. Therefore, the fluid cannot flow from the second flow path 2b to the first flow path 2a.

Namely, the valve body 10b works as a check valve, which prohibits the fluid to flow from the second flow path 2b to the first flow path 2a via the fourth flow paths 2h and allows the fluid to flow from the first flow path 2a to the second flow path 2b via the fourth flow paths 2h.

A rod-shaped flow control member 12 is provided in the main body 2. The flow control member 12 is tightly pierced through the ring packing 10a and capable of moving, in the axial direction, with respect to the ring packing 10a.

The flow control member 12 has a third flow path 12b, which is opened in one end face 12a and an outer circumferential face of the flow control member 12 and which makes the first flow path 2a communicate to the second flow path 2b via the ring packing 10a. Flow volume of the fluid flowing in the third flow path 12b can be controlled by adjusting the relative axial position of the flow control member 12 with respect to the ring packing 10a.

A bifurcated notch (an opening section) is formed in the one end 12a part. The bifurcated notch is opened in the one end face 12a and the outer circumferential face of the flow control member 12 as a V-shaped notch. By forming the bifurcated (V-shaped) notch, the one end 12a part of the flow control member is formed into a V-shape (see FIGS. 2 and 6). The space in the V-shape acts as the third flow path 12b.

Figure 6:
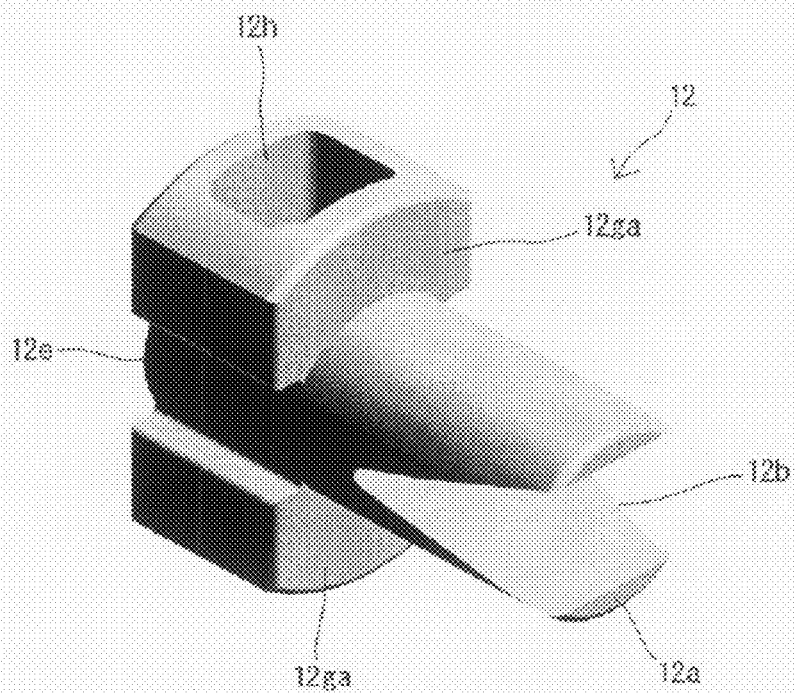
FIG. 6 is a perspective view of a flow control member of the flow controller of the first embodiment.

As shown in FIGS. 2 and 6, the width of the third flow path 12b or the V-shaped notch (the opening section) is gradually increased toward the one end 12a. Namely, the width of the third flow path 12b in the circumferential direction of the flow control member 12 is gradually increased toward the one end 12a, and a sectional area of the third flow path 12b perpendicular to the axial line of the flow control member 12 is gradually increased toward the one end 12a.

In the state shown in FIG. 2, the one end 12a part of the flow control member 12 corresponds to the ring packing 10a. By moving the flow control member 12 leftward, a sectional area of the third flow path 12b corresponding to the ring packing 10a and opening areas of the open ends of the third flow path 12b, which are opened in the side faces 12c and 12d of the flow control member 12, on the first flow path 2a side with respect to the ring packing 10a are gradually reduced. Therefore, flow volume of the fluid flowing in the third flow path 12b is reduced. More precisely, the sectional area of the third flow path 12b in the ring-shaped part of the ring packing 10a and the smaller opening part of the open ends of the third flow path 12b, which are opened in the side faces 12c and 12d of the flow control member 12, on the first flow path 2a side with respect to the ring packing 10a restrain the flow volume of the fluid flowing in the third flow path 12b.

Namely, the flow volume of the fluid flowing in the third flow path 12b can be adjusted by the axial position of the flow control member 12 with respect to the ring packing 10a.

Notching depths of the V-shaped notch, from the one end 12a, in the both side faces 12c and 12d of the flow control member 12 are mutually different. As shown in FIG. 2, the notching depth in the front face 12c is deeper than the notching depth in the rear face 12d.

With this structure, when the flow control member 12 is moved to locate a branching part of the V-shaped notch in the ring packing 10a so as to reduce the flow volume of the fluid in the third flow path 12b, the branching part in the rear face 12d is closed by the ring packing 10a, so that the first flow path 2a and the second flow path 2b are not mutually communicated; the first flow path 2a and the second flow path 2b are mutually communicated via the branching part in the front face 12c only. Namely, the first flow path 2a and the second flow path 2b can be mutually communicated via the V-shaped notch in the front face 12c only, so that the flow volume of the fluid flowing in the third flow path 12b can be precisely controlled even if the flow volume is small.

Next, a mechanism for axially moving the flow control member 12, which includes operation means, e.g., knob 4, will be explained.

As shown in FIG. 2, projected sections 12g are formed in the other end 12e part of the flow control member 12, which is located in the first flow path 12a. The projected sections 12g respectively have second screw sections 12f, which are radially extended with respect to the axial line of the flow control member 12 until reaching the inner circumferential face of the knob 4 via the through-holes 2c and 2d of the main body 2 and which are screwed with the first screw section 4a of the knob 4.

Each of the projected sections 12g is constituted by a first part 12ga (see FIG. 6), which is integrated with the flow control member 12, and a second part 12gb (see FIG. 7), which has an insert section 12i fitted in a hole 12h formed in an end face of the first part 12ga. By fitting the insert section 12i into the hole 12h, the second part 12gb is attached to the first part 12ga. The second screw section 12f, which is screwed with the first screw section 4a of the knob 4, is formed in the second part 12gb.

The flow controller S1 can be easily assembled by inserting the flow control member 12, to which no second parts 12gb are attached, into the main body 2 and fitting the insert sections 12i of the second part 12gb into the holes 12h via the through-holes 2c and 2d of the main body 2.

By manually turning the knob 4, the first and second screw sections 4a and 12f move the flow control member 12 in the axial direction.

Note that, the projected sections 12g are introduced through the through-holes 2c and 2d. With this structure, when the knob 4 is turned with respect to the main body 2, the projected sections 12g are engaged with edges of the through-holes 2c and 2d. Therefore, the flow control member 12 is not turned, with respect to the main body 2, together with the knob 4. The projected sections 12g, which are introduced through the through-holes 2c and 2d of the main body 2, prevents the flow control member 12 from rotation.

Second Embodiment

A second embodiment will be explained. Note that, the structural elements explained in the first embodiment are assigned the same symbols and explanation will be omitted.

Figure 8:
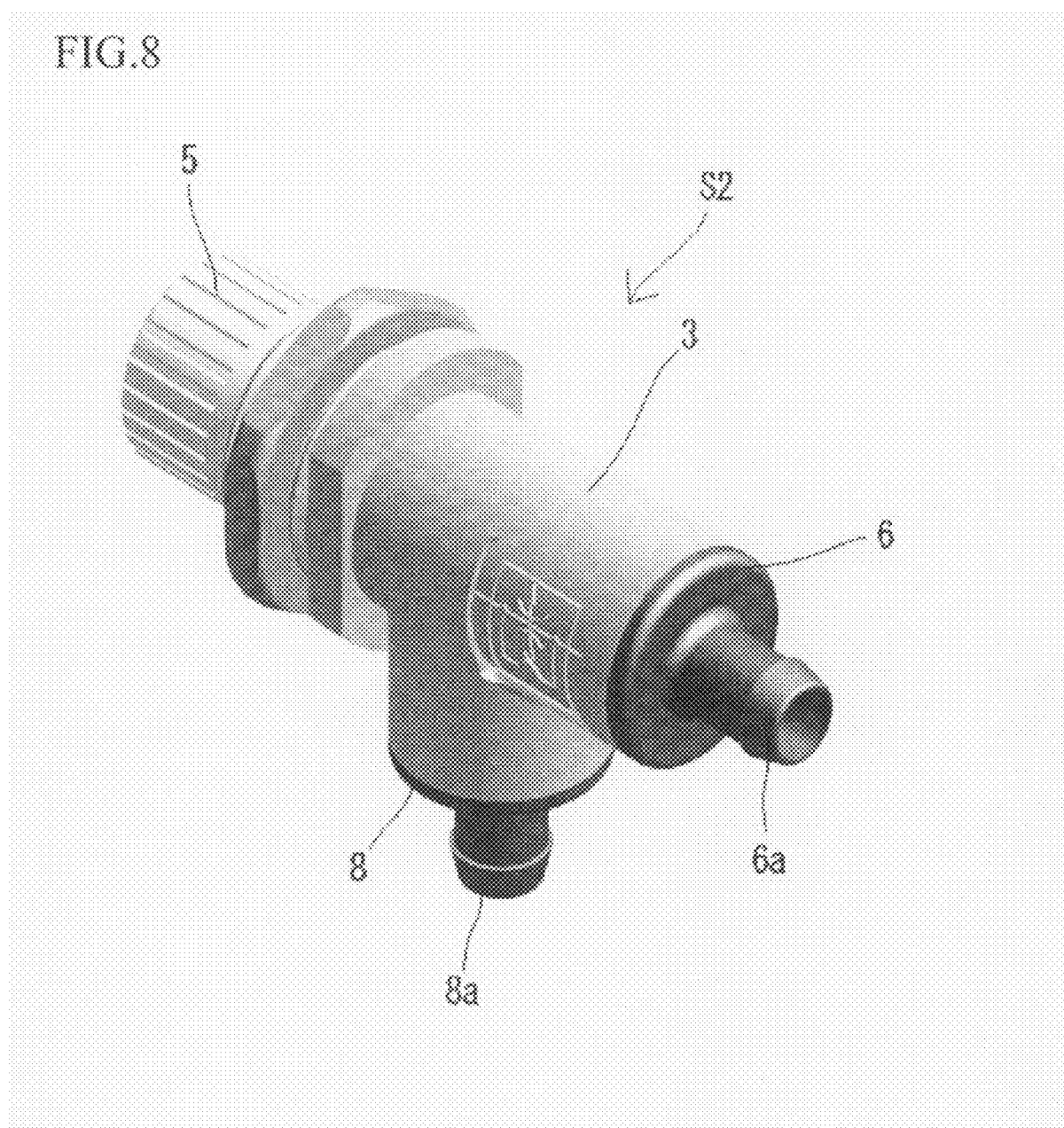
FIG. 8 is a perspective view of a flow controller of a second embodiment.
Figure 9:
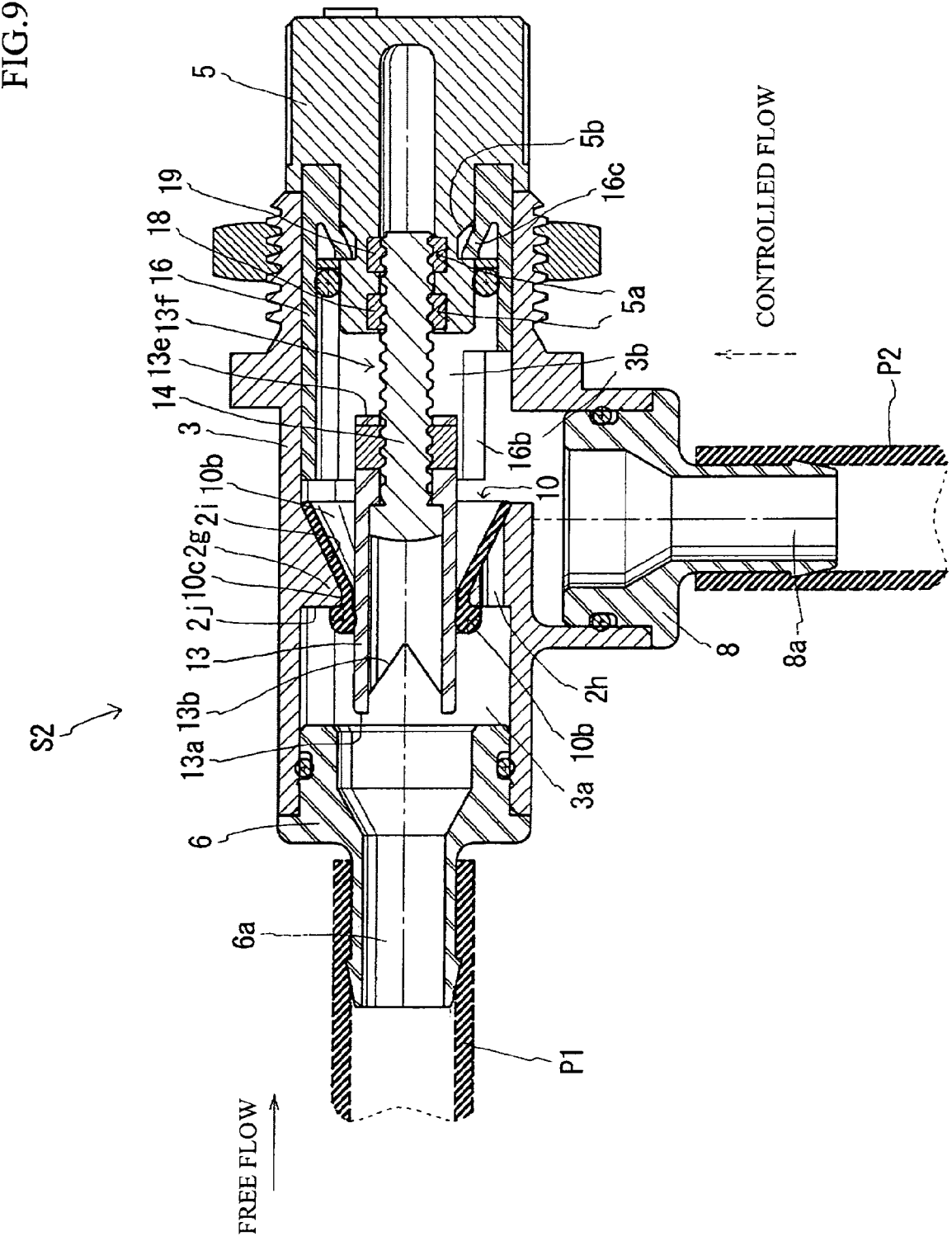
FIG. 9 is a sectional view of the flow controller of the second embodiment.

FIG. 8 is a perspective view of a flow controller S2 of the second embodiment; and FIG. 9 is a sectional view of the flow controller showing its inner mechanism.

Figure 10:
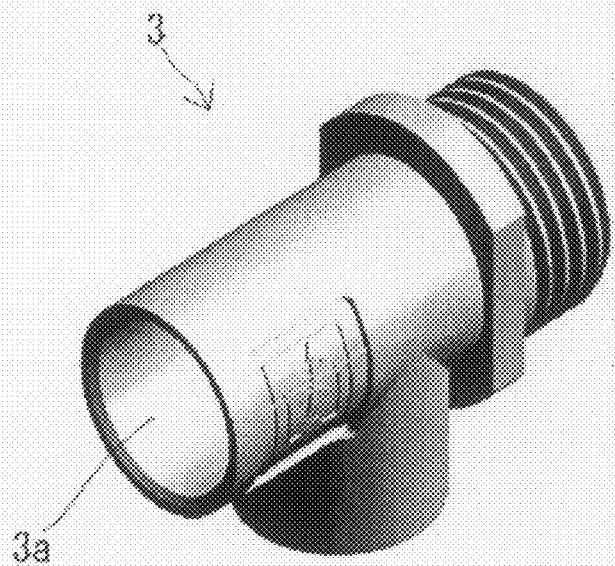
FIG. 10 is a perspective view of a main body of the flow controller of the second embodiment.

A main body 3 of the flow controller S2 is constituted by a T-shaped pipe (see FIG. 10).

As shown in FIG. 8, a knob 5, which can be manually turned, the first nipple member 6 having the first port 6a and the second nipple member 8 having the second port 8a are respectively provided to ends of the T-shaped main body 3. The nipple members 6 and 8 are arranged so as to orthogonally cross the axial lines of the first port 6a and the second port 8a. In the second embodiment, the second nipple member 8 is provided to the lower end of the vertical section of the T-shaped pipe; the knob 5 and the first nipple member 6 are respectively provided to the ends of the horizontal section of the T-shaped pipe.

As shown in FIG. 9, a first flow path 3a, which is communicated to the first port 6a, and a second flow path 3b, which is communicated to the second port 8a, are formed in the main body 3.

The circular projection 2g, the fourth flow paths 2h and the rubber member 10 including the ring packing 10a and the valve body 10b are provided as well as the first embodiment.

A hollow rod-shaped flow control member 13 is provided in the main body 3. The flow control member 13 is tightly pierced through the ring packing 10a and capable of relatively moving, in the axial direction, with respect to the ring packing 10a. While moving the flow control member 13, an outer circumferential face of the flow control member 13 tightly contacts an inner circumferential face of the ring packing 10a, as well as the first embodiment.

The flow control member 13 has a third flow path 13b, which is opened in one end face 13a and the outer circumferential face thereof and which makes the first flow path 3a communicate to the second flow path 3b via the ring packing 10a. Flow volume of the fluid flowing in the third flow path 13b can be controlled by adjusting the relative axial position of the flow control member 13 with respect to the ring packing 10a.

A bifurcated notch (an opening section) is formed in the one end 13a part of the flow control member 13. The bifurcated notch is opened in the one end face 13a and the outer circumferential face of the flow control member 13 as a V-shaped notch. By forming the bifurcated (V-shaped) notch, the one end 13a part of the flow control member 13 is formed into a V-shape (see FIGS. 9 and 12). The space in the V-shape acts as the third flow path 13b.

In the first embodiment, the one end 12a part of the flow control member 12, in which the V-shaped notch is formed, is headed toward the second flow path 2b. On the other hand, in the second embodiment, the one end 13a part of the flow control member 13, in which the V-shaped notch is formed, is headed toward the first flow path 3a. Note that, the one end 13a part may be headed toward the second flow path 3b. Namely, the one end 13a part, in which the V-shaped notch is formed, may be optionally headed toward the first flow path 3a or second flow path 3b.

Figure 12:
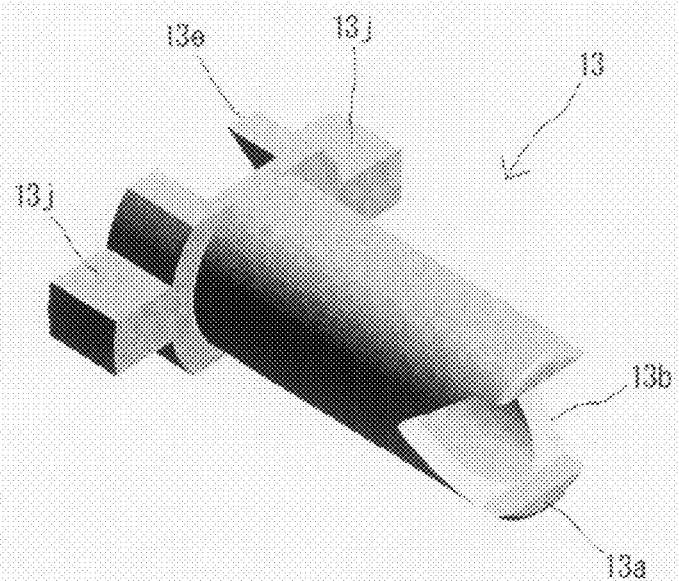
FIG. 12 is a perspective view of a flow control member of the flow controller of the second embodiment.

As shown in FIGS. 9 and 12, the width of the third flow path 13b or the V-shaped notch (the opening section) is gradually increased toward the one end 13a. Namely, the width of the third flow path 13b in the circumferential direction of the flow control member 13 is gradually increased toward the one end 13a.

The flow volume of the fluid flowing in the third flow path 13b can be adjusted by varying area of the third flow path 13b opened in the side face of the flow control member 13, which is located on the second flow path 3b side with respect to the ring packing 10a. The area of the third flow path 13b opened in the side face is varied by the axial position of the flow control member 13 with respect to the ring packing 10a.

Notching depths of the V-shaped notch, from the one end 13a, in the both side faces of the flow control member 13 are mutually different as well as the first embodiment.

With this structure, when the flow control member 13 is moved to locate the branching part of the V-shaped notch in the ring packing 10a, the first flow path 3a and the second flow path 3b are mutually communicated via the V-shaped notch in one side face only, so that the flow volume of the fluid passing through the third flow path 13b can be precisely controlled, as well as the first embodiment, even if the flow volume is small.

Next, a mechanism for axially moving the flow control member 13, which includes the operation means, e.g., knob 5, will be explained.

As shown in FIG. 12, projected sections 13j are formed in the other end 13e part of the flow control member 13. The projected sections 13j are radially extended, with respect to the axial line of the flow control member 13, from the both side faces of the flow control member 13.

Figure 13A:
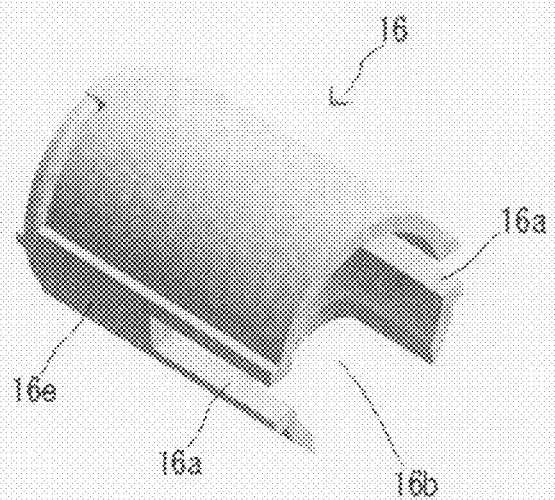
FIG. 13A is a perspective view of a stopper of the flow controller of the second embodiment seen from the first flow path side.
Figure 13B:
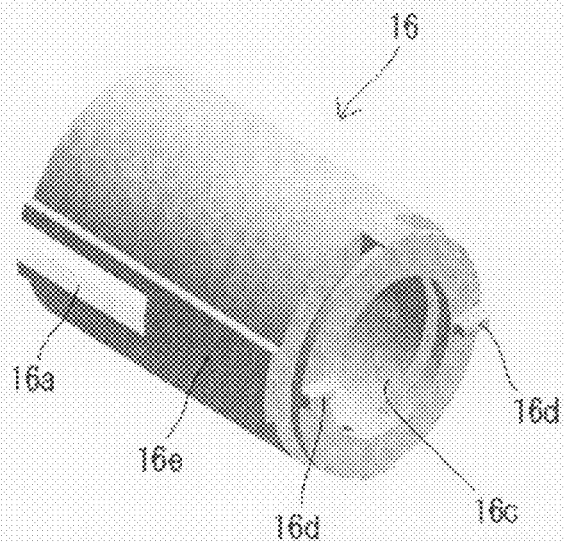
FIG. 13B is a perspective view of a stopper of the flow controller of the second embodiment seen from the knob side.

Further, as shown in FIG. 9, a cylindrical stopper 16 is provided in the main body 3, more precisely provided in the end part of the main body 3, to which the knob 5 will be attached. The stopper 16 is coaxially arranged with the main body 3, so an outer circumferential face 16 is arranged along an inner circumferential face of the main body 3. As shown in FIGS. 13A and 13B, projected sections 16e are formed on the outer circumferential face of the stopper 16 and extended in the axial direction thereof. On the other hand, recesses, which are capable of respectively engaging with the projected sections 16e, are formed in the inner circumferential face of the main body 3. With this structure, the stopper 16 cannot be turned with respect to the main body 3. The stopper 16 has guide notches 16a, in which the projected sections 13j of the flow control member 13 will be respectively fitted (see FIG. 13A). With this structure, the flow control member 13 can be moved in the axial direction. Further, the stopper 16 has a notch 16b so as not to obstruct the flow of the fluid in the second flow path 3b.

As shown in FIG. 9, an engage section 16c of the stopper 16 is engaged with an engage section 5b of the knob 5, which is formed like a circumferential groove, so that the knob 5 is rotatably retained.

The one end 13a of the flow control member 13 is headed for the first port 6a. A bolt 14 is provided to the other end 13e of the flow control member 13. The bolt 14 is coaxially arranged with the flow control member 13 as a first screw section 13f. Nuts 18 and 19 are provided to the knob 5 as second screw sections 5a screwed with the first screw section 13f.

Figure 11:
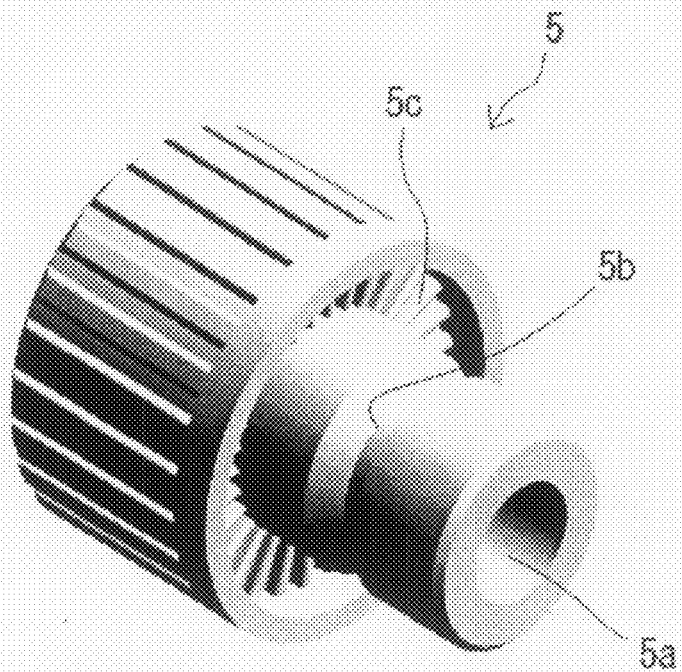
FIG. 11 is a perspective view of a knob of the flow controller of the second embodiment.

A plurality of recesses 5c are formed in an inner face of the knob 5 (see FIG. 11) and arranged in the circumferential direction. Projections 16c, which can engage with the recesses 5c, are formed in one end face of the stopper 16, which faces the recesses 5c (see FIG. 13B). When the user turns the knob 5, the projections 16d run on the recesses 5c. On the other hand, when the user stops turning the knob 5 at an optional rotational position, the projections 16d engages with the recesses 5c, so that the knob 5 can be retained at that position.

With the above described structure, by manually turning the knob 5, the first and second screw sections 13f and 5a move the flow control member 13 in the axial direction thereof.

At that time, the projected sections 13j have fitted in the guide notches 16a of the stopper 16. Therefore, the flow control member 13 is not turned together with the knob 5 when the knob 5 is manually turned. Namely, the projected sections 13j and the guide notches 16a of the stopper 16 prevent the flow control member 13 from rotation.

In each of the flow controllers S1 and S2, the fluid flows form the first port 6a to the second port 8a via the fourth flow paths 2h as free flow. On the other hand, the fluid flows form the second port 8a to the first port 6a via the third flow path 12b or 13b as controlled flow, whose flow volume is controlled by changing the axial position of the flow control member 12 or 13. Unlike the conventional flow controller, each of the flow controllers S1 and S2 is capable of precisely controlling flow volume of the fluid with the unique flow control member 12 or 13 even if the flow volume is small.

The flow volume is controlled by the third flow path 12b or 13b, which is opened in the outer circumferential face of the rod-shaped flow control member 12 or 13, and the ring packing 10a. Namely, the flow controller S1 and S2 has no weak member, e.g., the needle of the conventional flow controller, so that the flow control members 12 and 13 are not badly damaged by fluid resistance. Therefore, the parts of the flow control members 12 and 13 can be composed of a light and inexpensive material, e.g., plastic.

Note that, the present invention is not limited to the above described embodiments. Various modifications can be allowed.

Figure 14:
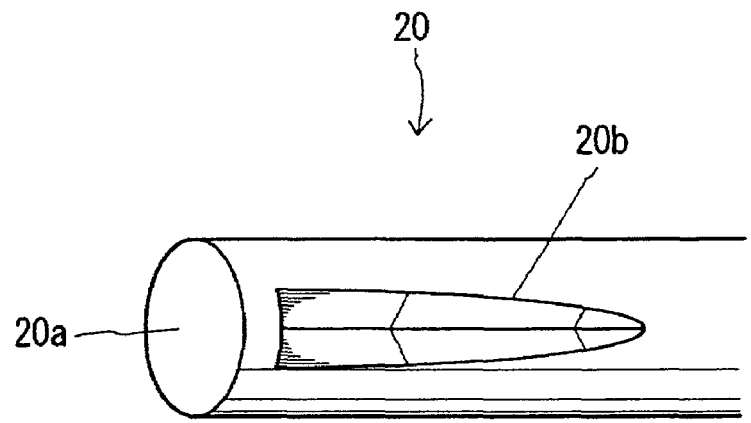
FIG. 14 is an explanation view of another flow control member.
Figure 15:
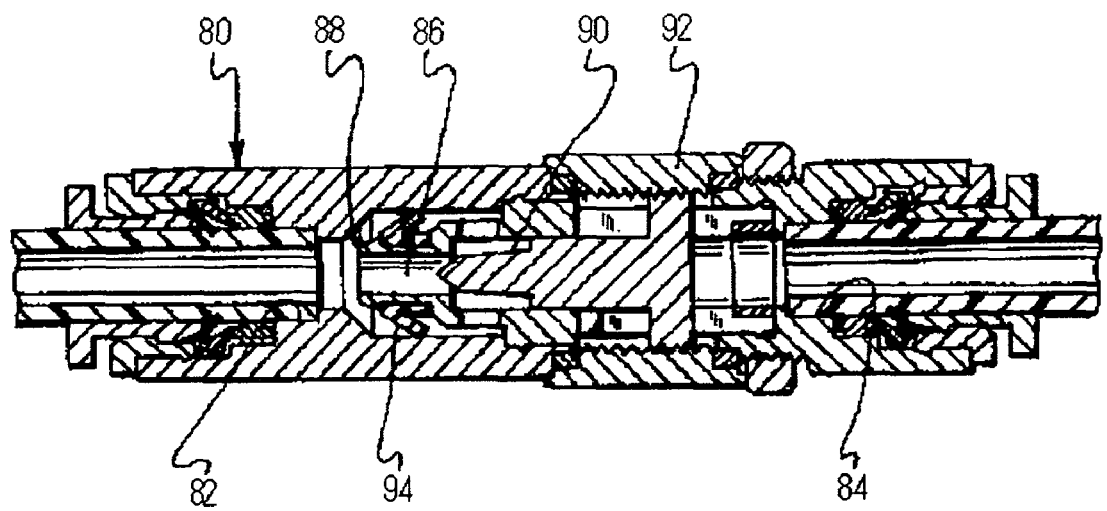
FIG. 15 is a sectional view of the conventional flow controller.
Figure 16A:
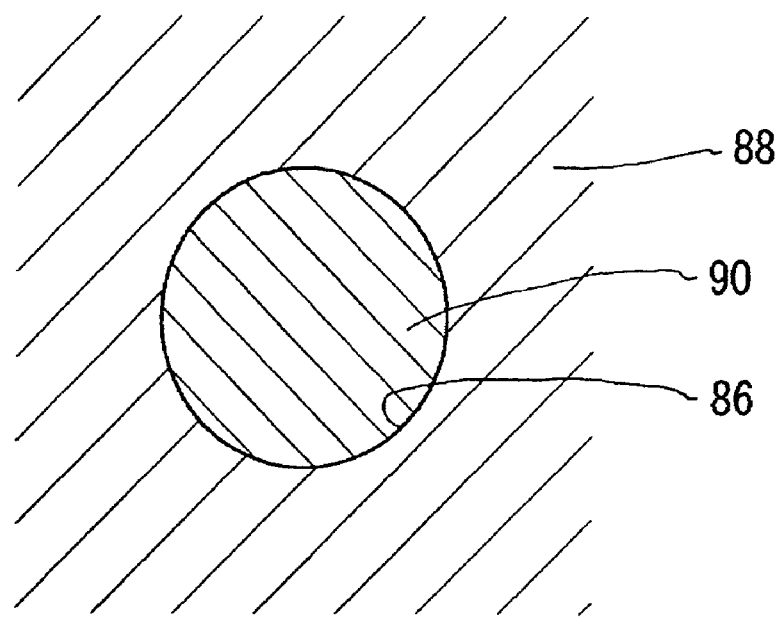
FIG. 16A is a partial sectional view of the conventional flow controller, wherein no clearance is formed between a needle and a control hole.
Figure 16B:
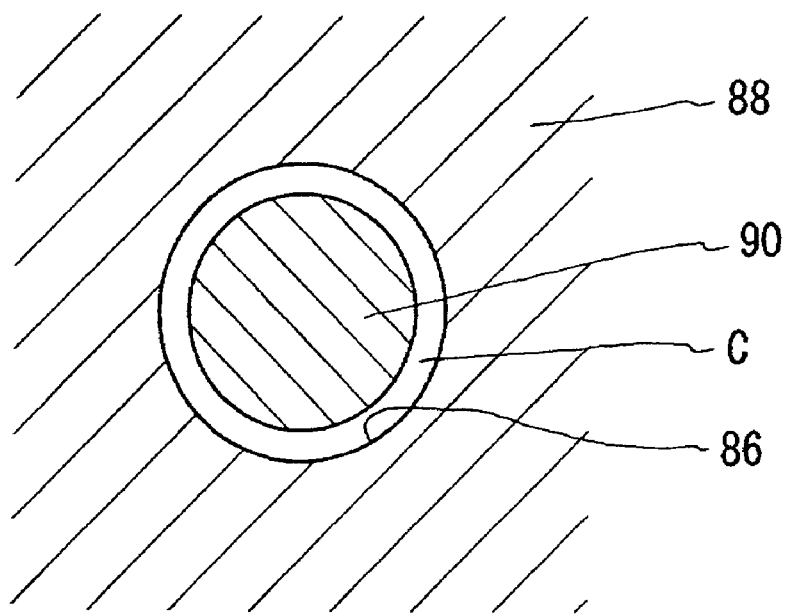
FIG. 16B is a partial sectional view of the conventional flow controller, wherein a clearance is formed between the needle and the control hole.

The third flow path formed in the flow control member must be opened in at least the outer circumferential face of the flow control member, and the flow volume of the fluid passing through the third flow path must be controlled according to the relative position of the flow control member with respect to the ring packing. For example, a flow control member 20 shown in FIG. 14 may be employed. The flow control member 20 has a groove-shaped third flow path 20b. A circumferential width of an end of the third flow path 20b, which is opened in the outer circumferential face of the flow control member 20, is gradually increased toward one end 20a of the flow control member 20.

In the present invention, the flow control member need not be moved in the axial direction with respect to the ring packing. The ring packing may be moved with respect to the flow control member. Further, both of the flow control member and the ring packing may be moved.

The ring packing and the valve body need not be integrated. They may be separately provided.

The invention may be embodied in other specific forms without departing from the spirit of essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A flow controller, comprising:
a main body having a first flow path, which is communicated to a first port, and a second flow path, which is communicated to a second port;
a ring packing being provided between the first flow path and the second flow path so as to seal the first flow path and the second flow path;
a rod-shaped flow control member being tightly pierced through said ring packing and capable of relatively moving, in the axial direction, with respect to said ring packing, said flow control member having a third flow path, whose one end is opened at least in an outer circumferential face thereof and which communicates the first flow path to the second flow path via said ring packing, wherein flow volume of a fluid flowing in the third flow path is controlled by adjusting a position of said flow control member with respect to said ring packing;
operation means for relatively moving said ring packing and/or said flow control member in the axial direction of said flow control member;
a fourth flow path being provided outside of said ring packing so as to communicate the first flow path to the second flow path; and
a check valve prohibiting the fluid to flow from the second flow path to the first flow path via the fourth flow path and allowing the fluid to flow from the first flow path to the second flow path via the fourth flow path,
wherein the third flow path is a bifucated notch, which is formed by notching the one end of said flow control member in the axial direction and whose width is gradually increased toward the one end thereof, and a circumferential width of the end of the third flow path, which is opened in the outer circumferential face of said flow control member, is gradually increased toward the one end of said flow control member, and
wherein the bifurcated notch is opened in both side faces of said flow control member, and notching depths of the bifurcated notch in the both side faces are mutually different.

2. The flow controller according to claim 1,
wherein the third flow path is opened in the one end face of the flow control member and the outer circumferential face thereof, and
a sectional area of the third flow path perpendicular to the axial line of said flow control member is gradually increased toward the one end of said flow control member.

3. The flow controller according to claim 1,
wherein said operation means has a screw section, which is connected to said ring packing and/or said flow control member and a part of which is projected from said main body as a knob for rotating the screw section, and the screw section relatively moves said ring packing and/or said flow control member in the axial direction of said flow control member by rotating the knob.

4. The flow controller according to claim 1,
wherein said main body is a cylinder, in which the first flow path and the second flow path are respectively formed in both end parts and a through-hole is formed in an outer wall constituting one of the first flow path and the second flow path,
said operation means is coaxially provided to said main body, covers at least a part of an outer circumferential face of said main body and the through-hole, and has a cylindrical knob, which can be manually rotated with respect to said main body and in which a first screw section is formed in an inner circumferential face,
a projected section is projected in the direction perpendicular to the axial line of said flow control member from the end part of said flow control member, which corresponds to the one of first flow path and the second flow path, until reaching the inner circumferential face of the knob via the through-hole and has a second screw section, which is screwed with the first screw section of the knob, and
the flow control member is moved in the axial direction thereof by the first screw section and the second screw section, which are operated by rotating the knob.

5. The flow controller according to claim 1,
wherein the first port and the second port are provided to said main body, their axial lines are orthogonally arranged,
one end part of said flow control member is moved toward one of the first port and the second port, the other end part of said flow control member has a first screw section,
said operation means has a second screw section, which is screwed with the first screw section, and a knob, which is projected from the other end part of said flow control member until outside of said main body and which can be manually rotated, and
the flow control member is moved in the axial direction thereof by the first screw section and the second screw section, which are operated by rotating the knob.

6. A flow controller, comprising:
a main body having a first flow path, which is communicated to a first port, and a second flow path, which is communicated to a second port;
a ring packing being provided between the first flow path and the second flow path so as to seal the first flow path and the second flow path;
a rod-shaped flow control member being tightly pierced through said ring packing and capable of relatively moving, in the axial direction, with respect to said ring packing, said flow control member having a third flow path, whose one end is opened at least in an outer circumferential face thereof and which communicates the first flow path to the second flow path via said ring packing, wherein flow volume of a fluid flowing in the third flow path is controlled by adjusting a position of said flow control member with respect to said ring packing;
operation means for relatively moving said ring packing and/or said flow control member in the axial direction of said flow control member;
a fourth flow path being provided outside of said ring packing so as to communicate the first flow path to the second flow path; and
a check valve prohibiting the fluid to flow from the second flow path to the first flow path via the fourth flow path and allowing the fluid to flow from the first flow path to the second flow path via the fourth flow path;

wherein a circumferential width of the end of the third flow path, which is opened in the outer circumferential face of said flow control member, is gradually increased toward the one end of said flow control member, wherein said check valve includes a valve body which is integrated with said ring packing and formed into a cone shape inclined outwardly and extended from an inner part of said ring packing, and a neck section is formed in an outer circumferential face between said ring packing and the cone-shaped valve body, wherein a circular projection is formed, in an inner circumferential face of said main body, along an outer circumferential face of the cone-shaped valve body, and at least one through-hole is formed in the circular projection as the fourth flow path, and wherein the check valve is held in place in said main body by engaging the circular projection with the neck section, and the cone-shaped valve body is disposed along an outer face of the circular projection so as to close the fourth flow path.

7. The flow controller according to claim 6, wherein the third flow path is opened in the one end face of the flow control member and the outer circumferential face thereof, and a sectional area of the third flow path perpendicular to the axial line of said flow control member is gradually increased toward the one end of said flow control member.

8. The flow controller according to claim 6, wherein said operation means has a screw section, which is connected to said ring packing and/or said flow control member and a part of which is projected from said main body as a knob for rotating the screw section, and the screw section relatively moves said ring packing and/or said flow control member in the axial direction of said flow control member by rotating the knob.

9. The flow controller according to claim 6, wherein said main body is a cylinder, in which the first flow path and the second flow path are respectively formed in both end parts and a through-hole is formed in an outer wall constituting one of the first flow path and the second flow path, said operation means is coaxially provided to said main body, covers at least a part of an outer circumferential face of said main body and the through-hole, and has a cylindrical knob, which can be manually rotated with respect to said main body and in which a first screw section is formed in an inner circumferential face, a projected section is projected in the direction perpendicular to the axial line of said flow control member from the end part of said flow control member, which corresponds to the one of first flow path and the second flow path, until reaching the inner circumferential face of the knob via the through-hole and has a second screw section, which is screwed with the first screw section of the knob, and the flow control member is moved in the axial direction thereof by the first screw section and the second screw section, which are operated by rotating the knob.

10. The flow controller according to claim 6, wherein the first port and the second port are provided to said main body, their axial lines are orthogonally arranged, one end part of said flow control member is moved toward one of the first port and the second port, the other end part of said flow control member has a first screw section, said operation means has a second screw section, which is screwed with the first screw section, and a knob, which is projected from the other end part of said flow control member until outside of said main body and which can be manually rotated, and the flow control member is moved in the axial direction thereof by the first screw section and the second screw section, which are operated by rotating the knob.

* * * * *